(12) United States Patent
Lin et al.

(10) Patent No.: US 9,109,493 B2
(45) Date of Patent: Aug. 18, 2015

(54) APPARATUS AND METHOD TO DIAGNOSE A $NO_X$ SENSOR

(75) Inventors: Xiao Lin, Indianapolis, IN (US); Daniel D. Wilhelm, Nashville, IN (US); Baohua Qi, Columbus, IN (US); Xi Wei, Asbury, IA (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 1166 days.

(21) Appl. No.: 12/970,496

(22) Filed: Dec. 16, 2010

(65) Prior Publication Data

US 2011/0252767 A1    Oct. 20, 2011

Related U.S. Application Data

(60) Provisional application No. 61/286,958, filed on Dec. 16, 2009.

(51) Int. Cl.
*F01N 3/00* (2006.01)
*F01N 3/20* (2006.01)
(Continued)

(52) U.S. Cl.
CPC ............ *F01N 3/208* (2013.01); *F02D 41/0275* (2013.01); *F02D 41/146* (2013.01);
(Continued)

(58) Field of Classification Search
CPC .............. F01N 3/208; F01N 2560/026; F01N 2560/14; F01N 2900/0404; F02D 41/024; F02D 41/0275; F02D 41/1441; F02D 41/146; F02D 41/222; F02D 2041/1432; Y02T 10/24

USPC ............ 60/274, 276, 277, 286, 295, 301, 303
See application file for complete search history.

(56) References Cited

U.S. PATENT DOCUMENTS 6,925,796 B2    8/2005    Nieuwstadt et al.
7,121,085 B2 *  10/2006   van Nieuwstadt .............. 60/286
(Continued)

FOREIGN PATENT DOCUMENTS

EP      2 128 396       12/2009
WO      WO-2006/081598  8/2006

OTHER PUBLICATIONS

International Search Report and Written Opinion, PCT/2010/060805, Feb. 28, 2011, Cummins Filtration IP, Inc.
(Continued)

*Primary Examiner* — Thomas Denion
*Assistant Examiner* — Diem Tran
(74) *Attorney, Agent, or Firm* — Foley & Lardner LLP

(57) ABSTRACT

A method includes raising a temperature of an SCR catalyst for a predetermined time period while dosing urea. The method further includes maintaining the temperature of the SCR catalyst without dosing urea for a second predetermined time period. The method further includes filtering out at least low frequency data from a first $NO_x$ sensor upstream of the SCR catalyst and from a second $NO_x$ sensor downstream of the SCR catalyst, and comparing the filtered data from the first $NO_x$ sensor and the second $NO_x$ sensor without dosing urea over a third predetermined time period. The method further includes providing a $NO_x$ sensor condition index for at least one of the first $NO_x$ sensor and the second $NO_x$ sensor in response to the comparing.

24 Claims, 7 Drawing Sheets

(51) Int. Cl.
  *F02D 41/14* (2006.01)
  *F02D 41/22* (2006.01)
  *F02D 41/02* (2006.01)
(52) U.S. Cl.
  CPC .......... *F02D41/1441* (2013.01); *F02D 41/222* (2013.01); *F01N 2560/026* (2013.01); *F01N 2560/14* (2013.01); *F01N 2900/0404* (2013.01); *F02D 41/024* (2013.01); *F02D 2041/1432* (2013.01); *Y02T 10/24* (2013.01)

(56) References Cited

U.S. PATENT DOCUMENTS

| | | | |
|---|---|---|---|
| 7,603,846 B2 * | 10/2009 | Lueders et al. | 60/277 |
| 8,286,417 B2 * | 10/2012 | Allmer et al. | 60/277 |
| 2003/0051468 A1 | 3/2003 | Van Nieuwstadt et al. | |
| 2004/0094138 A1 | 5/2004 | Yasui et al. | |
| 2004/0200208 A1 | 10/2004 | Frank et al. | |
| 2007/0137181 A1 | 6/2007 | Upadhyay et al. | |
| 2008/0022658 A1 | 1/2008 | Viola et al. | |
| 2009/0293451 A1 | 12/2009 | Kesse | |
| 2010/0154386 A1 * | 6/2010 | Perrin et al. | 60/277 |

OTHER PUBLICATIONS

The Extended European Search Report issued in EP10838254.0, dated May 8, 2015.

* cited by examiner

APPARATUS AND METHOD TO DIAGNOSE A NO$_x$ SENSOR

RELATED APPLICATIONS

This application is related to, and claims the benefit of, U.S. Provisional application 61/286,958 entitled APPARATUS AND METHOD TO DIAGNOSE A NO$_X$ SENSOR, filed Dec. 16, 2009, which is incorporated herein by reference.

BACKGROUND

The technical field generally relates to diagnosing a NO$_x$ sensor, and more particularly but not exclusively relates to detecting a response difference between two NO$_x$ sensors on each side of a catalyst having ammonia storage capacity. Modern internal combustion engines often utilize aftertreatment systems to achieve emissions regulatory targets. One aftertreatment system is a NO$_x$ reduction device, including a catalyst for a selective catalytic reduction (SCR) system. It is helpful for controls, and in some cases dictated by regulation, that a failed or off-nominal NO$_x$ sensor be detected, allowing the control scheme to use an alternate NO$_x$ determination and/or to set a failure indicator. NO$_x$ sensors that are commercially viable for field use with an internal combustion engine have an interference with ammonia (NH$_3$), erroneously detecting a significant percentage (80% or higher) of NH$_3$ as NO$_x$. Further, reactions within the NO$_x$ reduction device cause a difference to occur from the NO$_x$ in to the NO$_x$ out that is not attributable to the sensors. Therefore, merely comparing sensor signals during engine operations will not generally allow a determination of a failed or off-nominal sensor. Therefore, further technological developments are desirable in this area.

SUMMARY

One embodiment is a unique method for diagnosing errors in a NO$_x$ sensor. Further embodiments, forms, objects, features, advantages, aspects, and benefits shall become apparent from the following description and drawings.

DESCRIPTION OF THE ILLUSTRATIVE EMBODIMENTS

Figure 1:
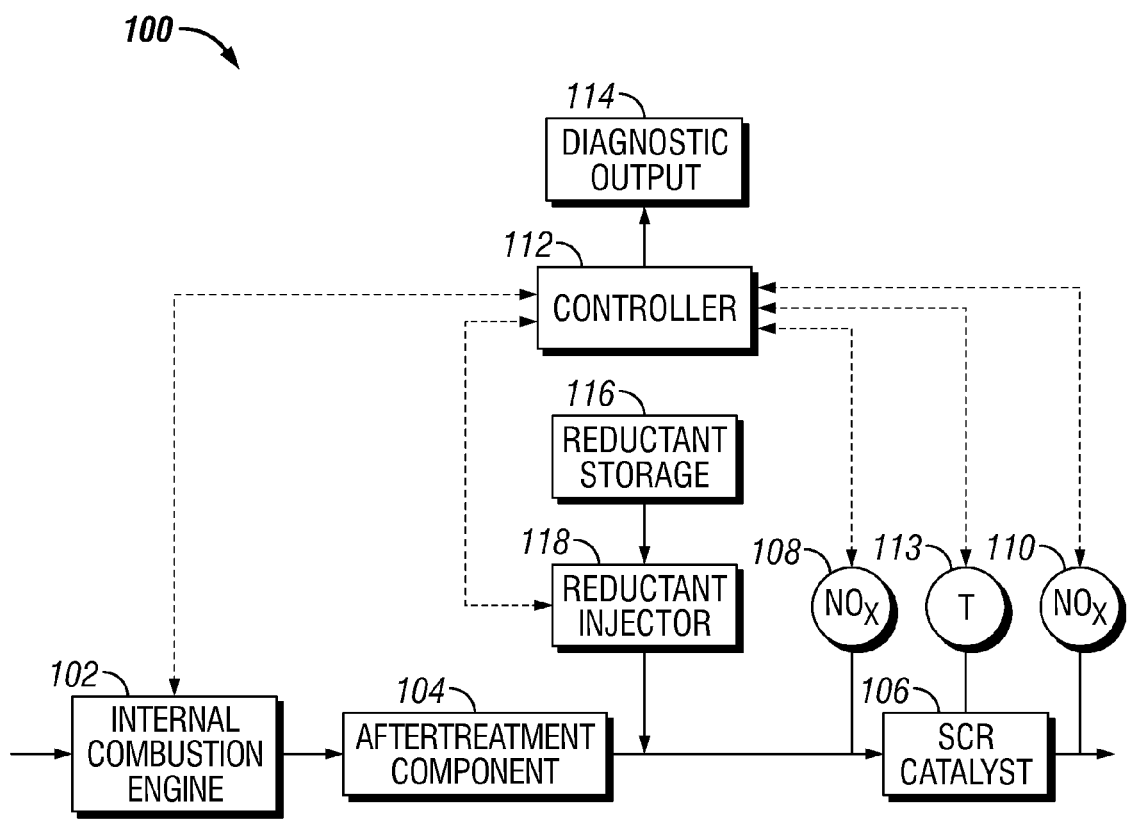
FIG. 1 is a schematic diagram of a system to diagnose a NO$_x$ sensor.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic diagram of an exemplary system 100 to diagnose a NO$_x$ sensor. The system 100 includes an internal combustion engine 102 producing an exhaust gas stream having certain emissions that are treated by an aftertreatment component 104 and/or by an SCR catalyst 106. The system 100 includes a temperature determination of the SCR catalyst, which may include one or more temperature sensors 113 and/or temperature models. The temperature sensor 113 is indicated at a mid-bed of the SCR catalyst 106, but the temperature sensor 113 may also be upstream and/or downstream of the SCR catalyst 106. The SCR catalyst 106 may further be modeled, in certain embodiments, for example from an upstream temperature in the exhaust stream.

The system 100 further includes a reductant storage 116 that supplies reductant to a reductant injector 118. The reductant injector 118 adds reductant to the exhaust stream at a position upstream of the SCR catalyst 106. The reductant includes urea and/or ammonia, and the SCR catalyst 106 has some ammonia storage capacity. The magnitude of the SCR catalyst 106 ammonia storage capacity is a function of the temperature of the SCR catalyst 106. It is known in the art that generally a lower temperature of the SCR catalyst 106 increases the ammonia storage capacity of the SCR catalyst 106.

The system 100 further includes a first NO$_x$ sensor 108 upstream of the SCR catalyst 106 and a second NO$_x$ sensor 110 downstream of the SCR catalyst 106. The first NO$_x$ sensor 108 is illustrated at a position downstream of the reductant injector 118, but the first NO$_x$ sensor 108 may be positioned anywhere in the exhaust stream that is upstream of the SCR catalyst 106 and downstream of the internal combustion engine 102. In certain embodiments, injected urea hydrolyzes to ammonia in the exhaust stream and the first NO$_x$ sensor 108 reads ammonia at least partially as NO$_x$. Therefore, the first NO$_x$ sensor 108 may be positioned at a place within the exhaust stream where the urea is not expected to hydrolyze into gaseous phase detectable ammonia yet, for example at a position close to the reductant injector 118, or the first NO$_x$ sensor 108 may be positioned upstream of the reductant injector 118. In certain embodiments, the first NO$_x$ sensor 108 may be positioned where a portion or all of the injected reductant is expected to hydrolyze into ammonia, and the effect of the ammonia amount is estimated and subtracted from the first NO$_x$ sensor 108 indicated NO$_x$ level. In certain embodiments, the first NOx sensor 108 is not sensitive to ammonia in the exhaust stream.

The system 100 may further include hardware that is not illustrated in FIG. 1, but that is nevertheless contemplated herein. Specifically, and without limitation, in certain embodiments the system includes an oxidation catalyst, a turbocharger, an exhaust gas recirculation (EGR) loop, a hydrocarbon injector at a position upstream of the oxidation catalyst and/or aftertreatment component, a common rail fuel system of the internal combustion engine capable of delivering unburned hydrocarbons or heat from very-late combustion to the exhaust stream. The addition or substitution of one or more of the described hardware is well known in the art, and such hardware is not described further except where specific operations or procedures herein utilize such hardware.

The system 100 includes a diagnostic output 114 that receives certain information or commands from a controller 112. The diagnostic output 114 may be a hardware device (e.g. a malfunction indicator lamp), a controller (separate from or combined with the controller 112 described herein—e.g. an engine, transmission, or aftertreatment controller), a datalink (e.g. receiving diagnostic data published for on-board diagnostic (OBD) purposes), or any other device known in the art.

The system includes the controller 112 that performs certain operations to diagnose a $NO_x$ sensor 108, 110. In certain embodiments, the controller 112 forms a portion of a processing subsystem including one or more computing devices having memory, processing, and communication hardware. The controller 112 may be a single device or a distributed device, and the functions of the controller 112 may be performed by hardware or software. The controller 112 is in communication with any sensor, actuator, or component of the system 110 to perform the operations described herein. Communication may be direct, electronic, hard-wired, wireless, over a network, and/or over a datalink. The controller 112 may be a part of or in communication with an engine controller (not shown) and may determine engine operating parameters from the engine controller.

In certain embodiments, the controller 112 includes one or more modules structured to functionally execute the operations of the controller. In certain embodiments, the controller includes a regeneration event module, a diagnostic staging module, a sensor phasing module, a sensor filtering module, an SCR diagnostic module, and/or a reductant dosing module. The regeneration event module determines whether an aftertreatment component regeneration event has occurred and is complete. The diagnostic staging module guides the operations of the controller through three stages of a diagnostic procedure, and further controls pausing, delaying, aborting, and/or continuing the diagnostic procedure. The sensor phasing module corrects for a time difference in a differential flow element of the exhaust gas flow passing the first $NO_x$ sensor 108 and the second $NO_x$ sensor 110. The sensor filtering module filters the $NO_x$ sensor signals by filtering out at least low frequency information from the $NO_x$ sensor signals, and in certain embodiments by band pass filtering the $NO_x$ sensor signals. The SCR diagnostic module compares the filtered sensor data from each of the first $NO_x$ sensor and the second $NO_x$ sensor, and provides a sensor condition index in response to the compared values. The reductant dosing module provides a reductant dosing command, and the reductant injector 118 is responsive to the reductant dosing command 242.

The description herein including modules emphasizes the structural independence of the aspects of the controller 112, and illustrates one grouping of operations and responsibilities of the controller 112. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

Figure 2:
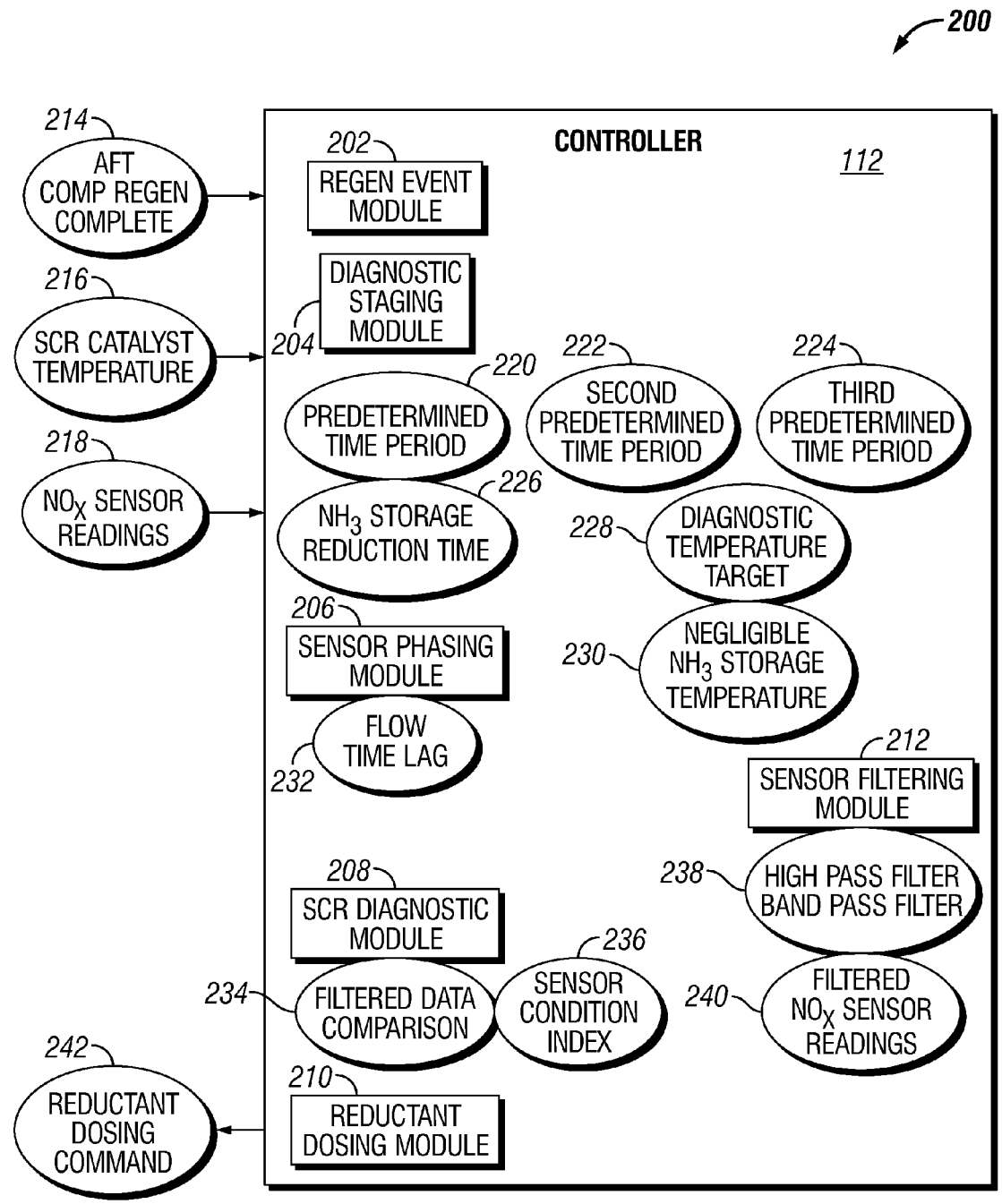
FIG. 2 is a schematic diagram of a controller that diagnoses a NO$_x$ sensor.

FIG. 2 is a schematic diagram of a controller 112 that diagnoses a $NO_x$ sensor 108, 110. The controller 112 includes a regeneration event module 202, a diagnostic staging module 204, a sensor phasing module 206, a sensor filtering module 212, and/or a reductant dosing module 210. The modules described are exemplary, and certain embodiments of the controller 112 may omit one or more modules.

The regeneration event module 202 determines whether an aftertreatment component regeneration event has occurred and is complete (e.g. by determining that parameter AFT COMP REGEN COMPLETE 214 is TRUE). Any regeneration event that includes an extended period of elevated SCR catalyst temperature 216, such as a temperature-based regeneration of a DPF, may be utilized herein to determine whether the aftertreatment component regeneration event has occurred and is complete.

The controller 112 further includes a diagnostic staging module 204. The diagnostic staging module guides the operations of the controller 112 through three stages of a diagnostic procedure, and further controls pausing, delaying, aborting, and/or continuing the diagnostic procedure. The diagnostic staging module 204 uses any combination of sensors and actuators known in the art to perform the described operations, including at least providing commands to the engine 102, a hydrocarbon injector, a turbocharger, a common rail fuel injection system, or any other hardware. In certain embodiments, in response to the regeneration event module 202 determining the conclusion of the aftertreatment regeneration event, the diagnostic staging module 204 maintains the SCR catalyst temperature 216 for a predetermined time period. The maintained temperature is a diagnostic temperature target 228, which may be a temperature selected to allow negligible $NH_3$ storage in the SCR catalyst 106—or a negligible $NH_3$ storage temperature 230. In certain catalyst formulations, a temperature of 500° C. is known to provide a very low $NH_3$ storage in the SCR catalyst. However, lower or higher temperature targets may be utilized for specific catalyst formulations as will be understood to one of skill in the art contemplating a particular catalyst for a particular embodiment of the system. The predetermined time period 220 is a time period selected to drive $NH_3$ storage in the SCR catalyst to a low level, or an $NH_3$ storage reduction time 226.

At the conclusion of the predetermined time period 220, the diagnostic staging module 204 continues to maintain the temperature in the SCR catalyst to the diagnostic temperature target 228, and commands a reductant dosing module 210 (which provides a reductant dosing command 242) to stop dosing reductant (e.g. urea or NH3) during a second predetermined time period 222. The diagnostic staging module 204 may determine whether an engine out $NO_x$ amount is compatible with stopping the reductant injection, and may delay the stopping the reductant injection and/or exit the diagnostic procedure if the engine out $NO_x$ amount is too high. The diagnostic staging module 204 may further estimate the time to complete the entire diagnostic procedure that will be required under the present conditions, determine an amount of $NO_x$ emissions release according to the time to complete the diagnostic procedure, and determine whether to proceed with, wait to execute, or abort the diagnostic procedure in response to the amount of $NO_x$ emissions release that is expected to occur to complete the entire diagnostic procedure.

At the conclusion of the second predetermined time period 222, the diagnostic staging module 204 continues to maintain the SCR catalyst temperature 216 to the diagnostic temperature target 228, and continues to command the reductant dosing module 210 to stop dosing. The diagnostic staging module 204 continues these operations for a third predetermined time period 224. During the third predetermined time period 224, the sensor filtering module 212 filters the $NO_x$ sensor readings 218 of the first $NO_x$ sensor 108 and the second $NO_x$ sensor 110 with a high pass filter or a band pass filter 238, and/or sequential high- and low-pass filters (in either order).

The sensor filtering module 212 provides the filtered $NO_x$ sensor readings 240 to other modules of the controller 112.

In certain embodiments, the sensor phasing module 206 corrects for flow time lag 232 between the first $NO_x$ sensor 108 and the second $NO_x$ sensor 110 before the sensor filtering module 212 executes the filtering. For example, the sensor phasing module 206 determines the flow time (from exhaust flow rate and volume in the exhaust between the $NO_x$ sensors 108, 110) of a differential quantum of exhaust flow between the $NO_x$ sensors 108, 110, buffers sufficient first $NO_x$ sensor 108 values to cover the flow time gap, and aligns the time sequences of $NO_x$ sensor readings 218 from the first $NO_x$ sensor 108 and second $NO_x$ sensor 110 such that the filters are operating on parallel differential quanta of exhaust flow. The sensor phasing module 206 operations described are exemplary, and any other operation to correct for the flow time between the first $NO_x$ sensor 108 and second $NO_x$ sensor 110 readings known in the art is contemplated herein. Further, one of skill in the art will further understand that the sensor phasing module 206 may be omitted, and that the inclusion of more high frequency information indicates the sensor phasing module 206 should be included, and the exclusion of more high frequency information indicates the sensor phasing module 206 is less beneficial for a particular embodiment.

The SCR diagnostic module 208 compares the sensor data from each of the first $NO_x$ sensor 108 and the second $NO_x$ sensor 110, which may be phased by the sensor phasing module 206 and/or filtered by the sensor filtering module 212 and thereby provided as a filtered data comparison 234, and provides a sensor condition index 236 in response to the compared values. In certain embodiments, the sensor condition index 236 is provided to a diagnostic output device 114.

The sensor condition index 236 and the comparison of the first $NO_x$ sensor 108 and the second $NO_x$ 110 sensor is described herein using filtered data. In certain embodiments, the comparison of the first $NO_x$ sensor 108 and the second $NO_x$ sensor 110 is made with unfiltered data, or with only nominally filtered data which is filtered for other purposes than removing frequency based information from the sensor values—for example a hardware de-bounce filter on the electronic signal from the sensor. The selection of filtered, unfiltered, high-pass filters, band pass filters, and sequential high- and low-pass filters can be determined according to the accuracy and diagnostic response time desired for a given system by one of skill in the art having the benefit of the disclosures herein.

Figure 3:
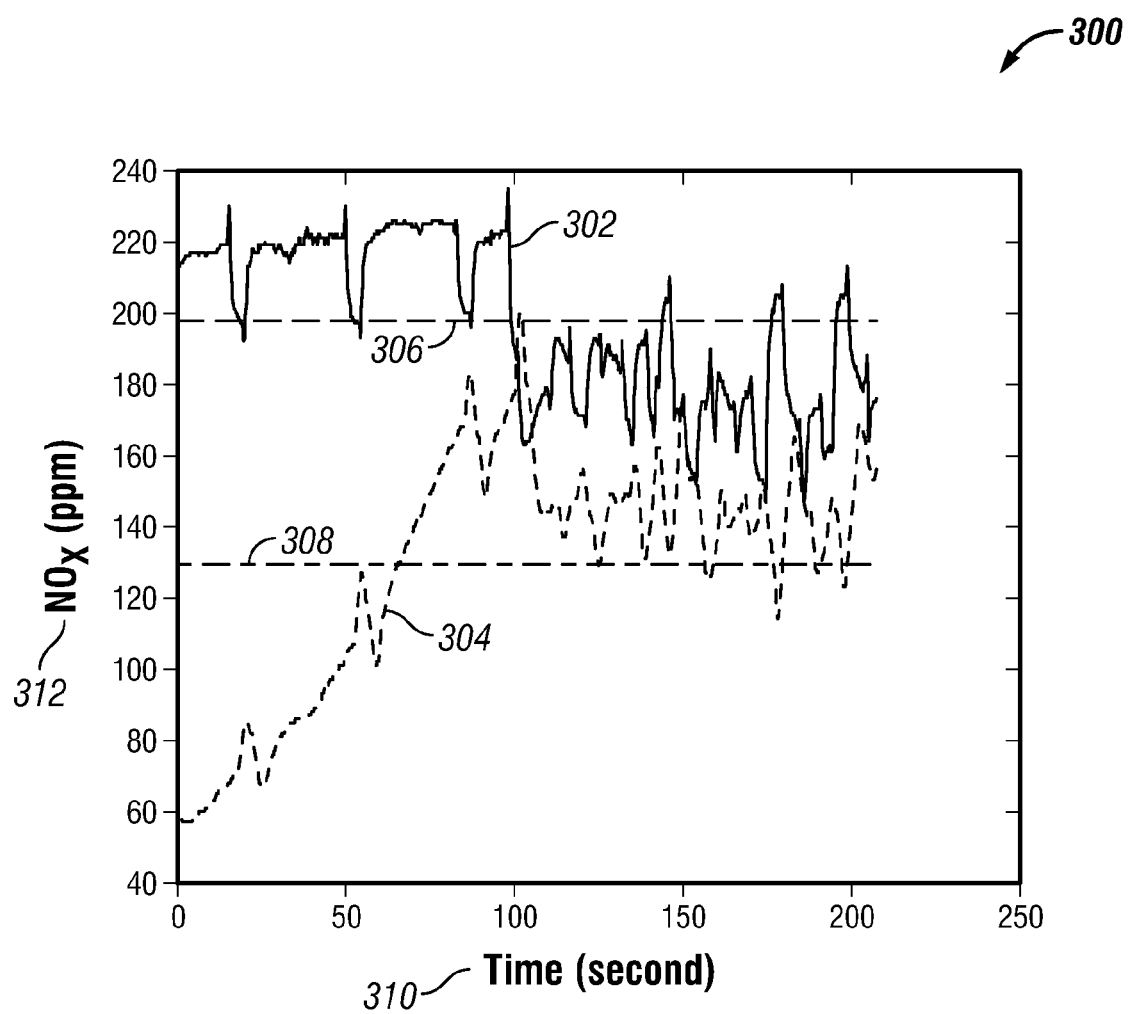
FIG. 3 is an illustration of raw NO$_x$ sensor outputs.

FIG. 3 is an illustration 300 of raw $NO_x$ sensor outputs. In the illustration of FIG. 3, an upper curve 302 is exemplary data for a first $NO_x$ sensor, and the lower curve 304 is exemplary data for a second $NO_x$ sensor, where the data is provided over exemplary operating period. The upper line 306 illustrates an average sensor reading for the first $NO_x$ sensor of about 200 ppm, and the lower line 308 illustrates an average sensor reading for the second $NO_x$ sensor of around 130 ppm. In the illustration of FIG. 3, the ratio between the averages is around 0.65 (Second/First) and the difference of the averages is around 70 ppm. It can also be seen that in many instances, the first and second $NO_x$ sensor readings are moving opposite (e.g. reference around 150 to 190 seconds). A time-domain difference plot between the two sensors would show very significant differences between the sensors. In certain embodiments, one of the first or second sensor from the data in FIG. 3 may be determined to be a failed sensor, and OBD actions, maintenance actions, engine control actions, and/or other responses may be required due to the differences exhibited between the sensors.

Figure 4:
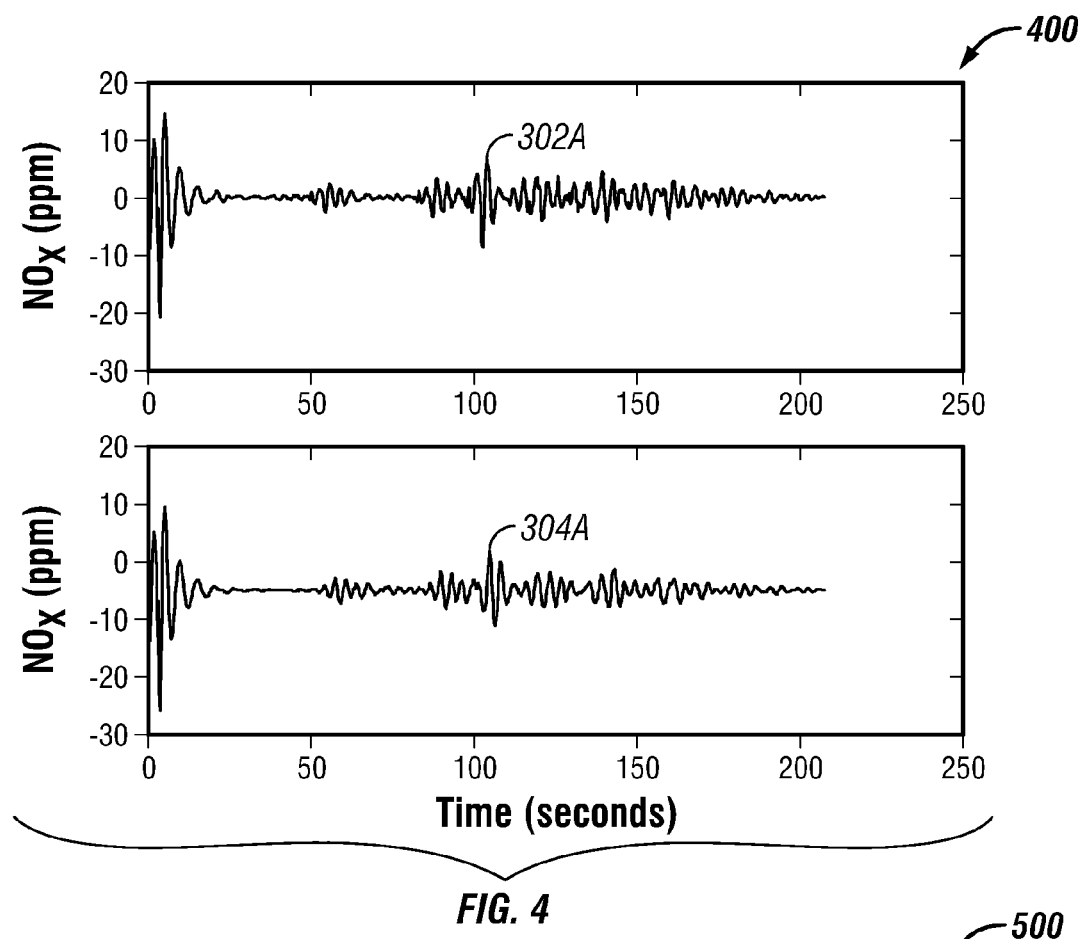
FIG. 4 is an illustration of band-pass filtered NO$_x$ sensor outputs.

FIG. 4 is an illustration 400 of band-pass filtered $NO_x$ sensor outputs 302A, 304A consistent with the unfiltered sensor outputs of FIG. 3. Because of the effect of the high-pass portion of the filter, it can be seen in the time domain data that a baseline $NO_x$ amount is removed and the filtered sensor data moves between about −20 ppm and 20 ppm in the illustration 400. The filtered $NO_x$ sensor outputs 302A, 304A may be utilized to determine the differences between the outputs of the first and second $NO_x$ sensors. Where the ratio Second/First was around 0.65 for the unfiltered data in FIG. 3, the ratio of Second/First is around 0.86 for the filtered data in FIG. 4. The filtered data in FIG. 4 was generated from a band pass filter with passband of about 0.15 Hz on the low end to 0.5 Hz on the high end.

Figure 5:
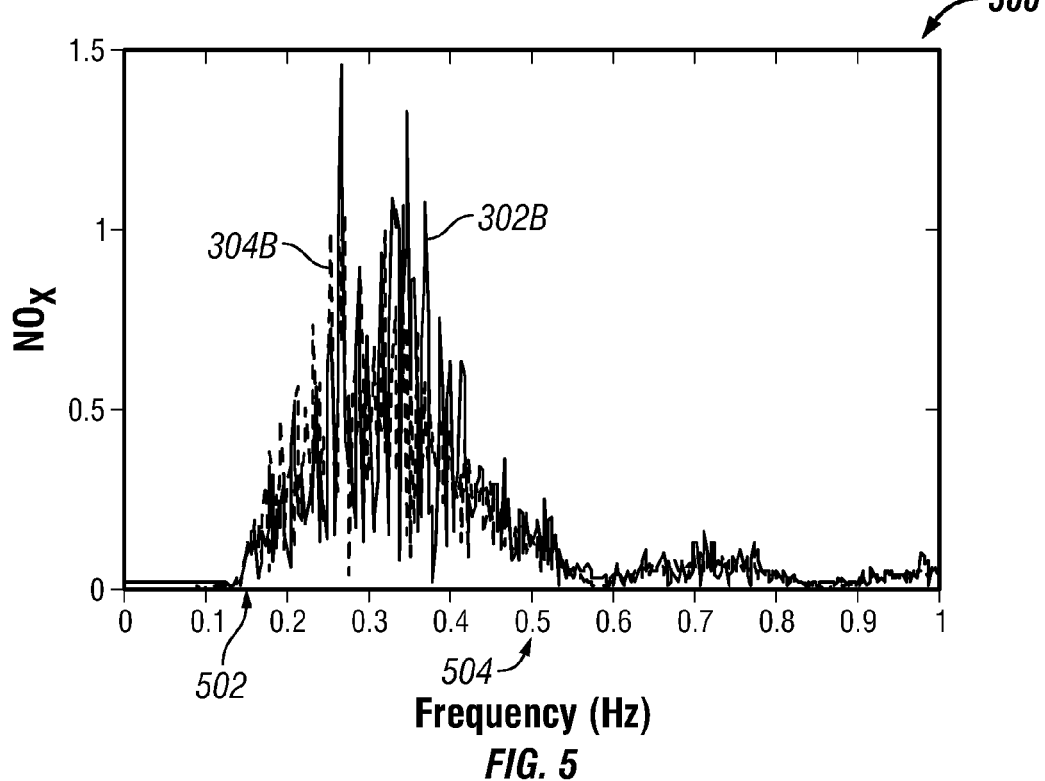
FIG. 5 is an illustration of frequency domain NO$_x$ sensor outputs.

Referencing FIG. 5, the frequency domain data 500 from the same data set generating the time domain data of FIG. 4 is illustrated. It can be seen in FIG. 5 for both curves 302B, 304B that frequencies outside the passband (ranging from 0.15 Hz at 502 to 0.50 Hz at 504) are attenuated significantly. The attenuation frequencies for the high pass and/or band pass filters are set to remove high-frequency noise that is above the base $NO_x$ detection signal response of the sensors. The detection signal response time of the $NO_x$ sensors varies, and the specific values are available from the manufacturer or by testing a particular sensor, but values between 200 ms to 500 ms are typical. Other noise that is filtered include noise generated by engine-out $NO_x$ fluctuations, the time lag between the first and second $NO_x$ sensors, and high frequency electronic noise carried on the sensor communication output. Low frequency noise may also be filtered from the signal, for example to remove low frequency complicating factors such as $NH_3$ storage effects of the SCR catalyst.

Figure 6:
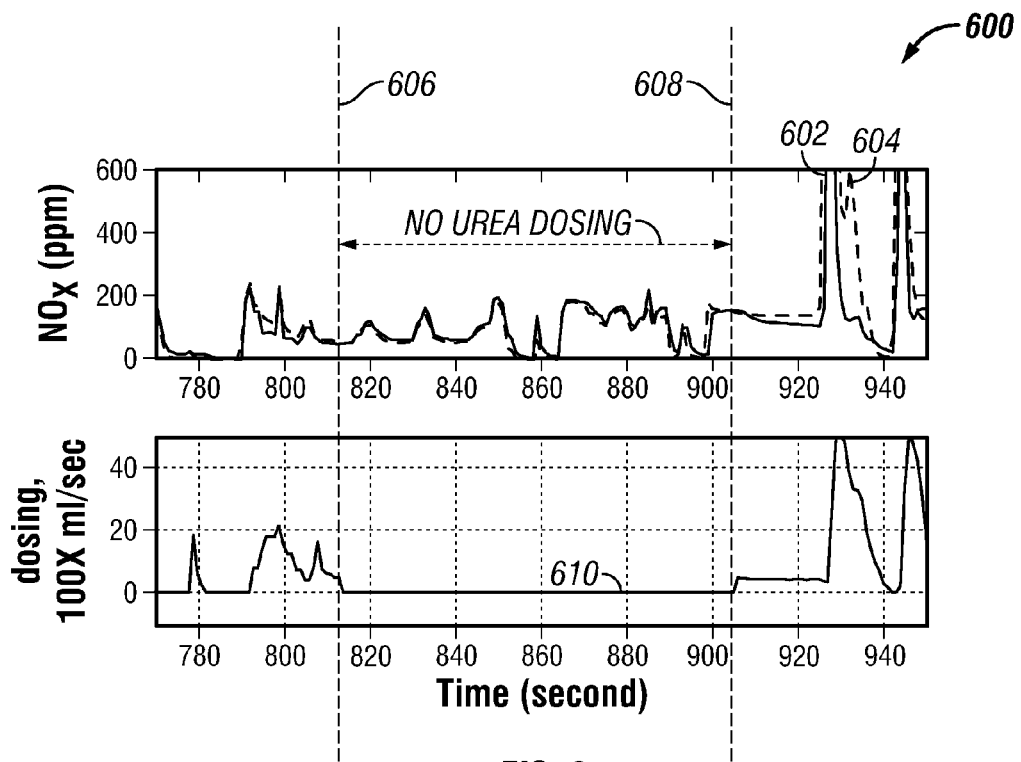
FIG. 6 is an illustration of an engine NO$_x$ output and urea dosing timeline.

Referencing FIG. 6, an illustration 600 of an engine $NO_x$ output and urea dosing timeline over the period of a diagnostic test is shown. In the illustration 600, an aftertreatment component regeneration has just completed (not shown) and a temperature of the SCR catalyst has been maintained for a first predetermined time period (e.g. for at least 10 minutes) completing a first stage of a $NO_x$ sensor diagnostic. The entire first stage of the $NO_x$ sensor diagnostic, or just a latter portion of the first stage of the $NO_x$ sensor diagnostic, can occur during the aftertreatment component regeneration event. Because the aftertreatment component regeneration event involves an elevated temperature over a period of time, the NH3 storage capacity of the SCR catalyst is already reduced at the end of the aftertreatment component regeneration event.

In the example of FIG. 6, it is determined that a low engine out $NO_x$ event has occurred (e.g. see $NO_x$ sensor outputs 602, 604 at times from 770-790 seconds) and it is determined to enter a second stage of the $NO_x$ sensor diagnostic and urea dosing 610 is discontinued at time 606 (around 810 seconds). The second stage is performed for a second predetermined time period—e.g. around 60 seconds in the example—driving stored $NH_3$ levels to a very low level. Upon completion of the second stage, a third stage is performed for a third predetermined time period—about 30 seconds in the example, where urea dosing is still suppressed and where the $NO_x$ sensor readings are filtered and compared. Upon the completion of the third stage, normal urea rejection is resumed at time 608 (around 905 seconds). The diagnostic may also be exited or paused due to an accumulated $NO_x$ emissions from the test (due to suppressed urea dosing) exceeds a threshold or a predetermined short-term value.

Figure 7:
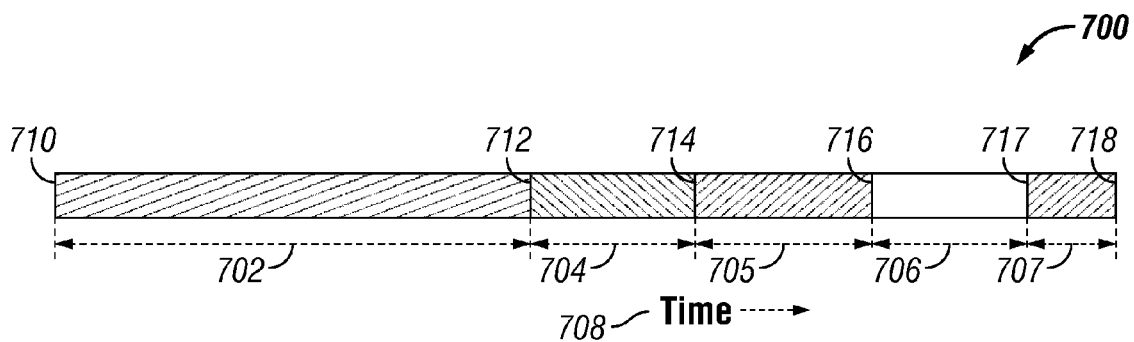
FIG. 7 is an illustration of a diagnosis procedure.

FIG. 7 is an illustration of a diagnosis procedure 700. During a first phase 702 of the diagnosis procedure 700, the SCR catalyst experiences an elevated bed temperature that is above a threshold value (e.g. 500° C.) for an predetermined period of time (e.g. 5 minutes). The first phase 702 may be initiated at a time 710 where an aftertreatment component regeneration event begins. If the aftertreatment component regeneration event provides the elevated temperature for the entire predetermined period ending at time 712, or provides the elevated temperature for a large fraction of the predetermined period, the diagnostic procedure 700 continues by either proceeding to the second phase 704 of the diagnosis procedure 700, or by maintaining the elevated temperature in the SCR catalyst until the predetermined period at time 712 is complete and then proceeding to the second phase 704 of the diagnosis procedure 700. During the first phase 702, the normal dosing of reductant by the reductant injector is performed.

During the second phase 704, dosing of reductant by the reductant injector is suppressed, and remaining stored $NH_3$ is driven off of the SCR catalyst. The second phase 704 is continued until a second time period is complete at time 714. The total time of the second phase 704 is based on the temperature of the SCR catalyst and the flow rate of exhaust gas through the SCR catalyst. The temperature and time values required to drive the $NH_3$ storage to acceptably low levels is readily determined by one of skill in the art with a routine data check on a catalyst element, but about 60 seconds at 500° C. will be sufficient for a typical catalyst element diagnosing a $NO_x$ sensor of a typical precision.

At the conclusion of the second phase 704, a third phase is executed. The third phase is illustrated in three portions 705, 706, 707 in the example of FIG. 7, although the third phase may be executed in a single portion as will be understood in the description following. During the third phase 705, 706, 707, dosing of reductant by the reductant injector is suppressed. The $NO_x$ sensor outputs are filtered and/or phase corrected, and an average of the $NO_x$ readings are compared to determine whether one of the $NO_x$ sensors is failed. One of the $NO_x$ sensors is understood to be the standard, and/or is verified through other means (e.g. comparison to engine outlet $NO_x$, or comparison to a third $NO_x$ sensor that is not shown), so the comparison of the $NO_x$ sensors provides a rationality diagnostic for the other one of the $NO_x$ sensors. In the example of FIG. 7, from a time 714 to a time 716, during a first portion 705 of the third phase, sensor data is filtered (and/or phased) and accumulated. In the example, at time 716, a sensor fault, error, or other diagnostic disabling condition is detected that indicates the diagnosis procedure 700 cannot continue but does not yet need to be aborted. At time 717, after a second portion 706 of the third phase, the disabling condition clears and the diagnostic is resumed. Certain conditions, including for example an overall emissions impact that exceeds a threshold or that is estimated to exceed a threshold before the completion of the diagnosis procedure 700, may be utilized to abort the diagnosis procedure 700 either immediately or after a pause such as the pause illustrated in the second portion 706 of the third phase.

At time 718, after a predetermined third period of time (equal to the time from time 714 to time 716, added to the time from time 717 to time 718), the diagnosis procedure 700 is complete and the accumulated data for the two sensors are compared. If the ratio of the average NOx detected by the two sensors is within an acceptable range, the NOx sensor is determined to pass. If the ratio of the average NOx detected by the two sensors is outside the acceptable range, the NOx sensor is not determined to pass, and appropriate fault logic is executed. The NOx sensor may be incremented or decremented towards a fault, or a fault may be set or cleared based on a single diagnostic execution. Any fault logic understood in the art is contemplated herein. The diagnosis procedure 700 may be performed after each aftertreatment component regeneration event, once per operation of the vehicle or other platform for the system, or be selectively performed by any other selection logic understood in the art.

Certain phases may be executed for any purpose, and/or completed under varying, alternate, or additional conditions from those listed. The emissions threshold may be selected according to the emissions impact requirement of the particular system, or for any other reason understood in the art. The emissions impact requirement varies according to any parameters understood in the art, including at least the certification levels of the engine, the role of the aftertreatment system in achieving the certification levels, and the required or negotiated emissions effects of the diagnostic procedure.

Figure 8:
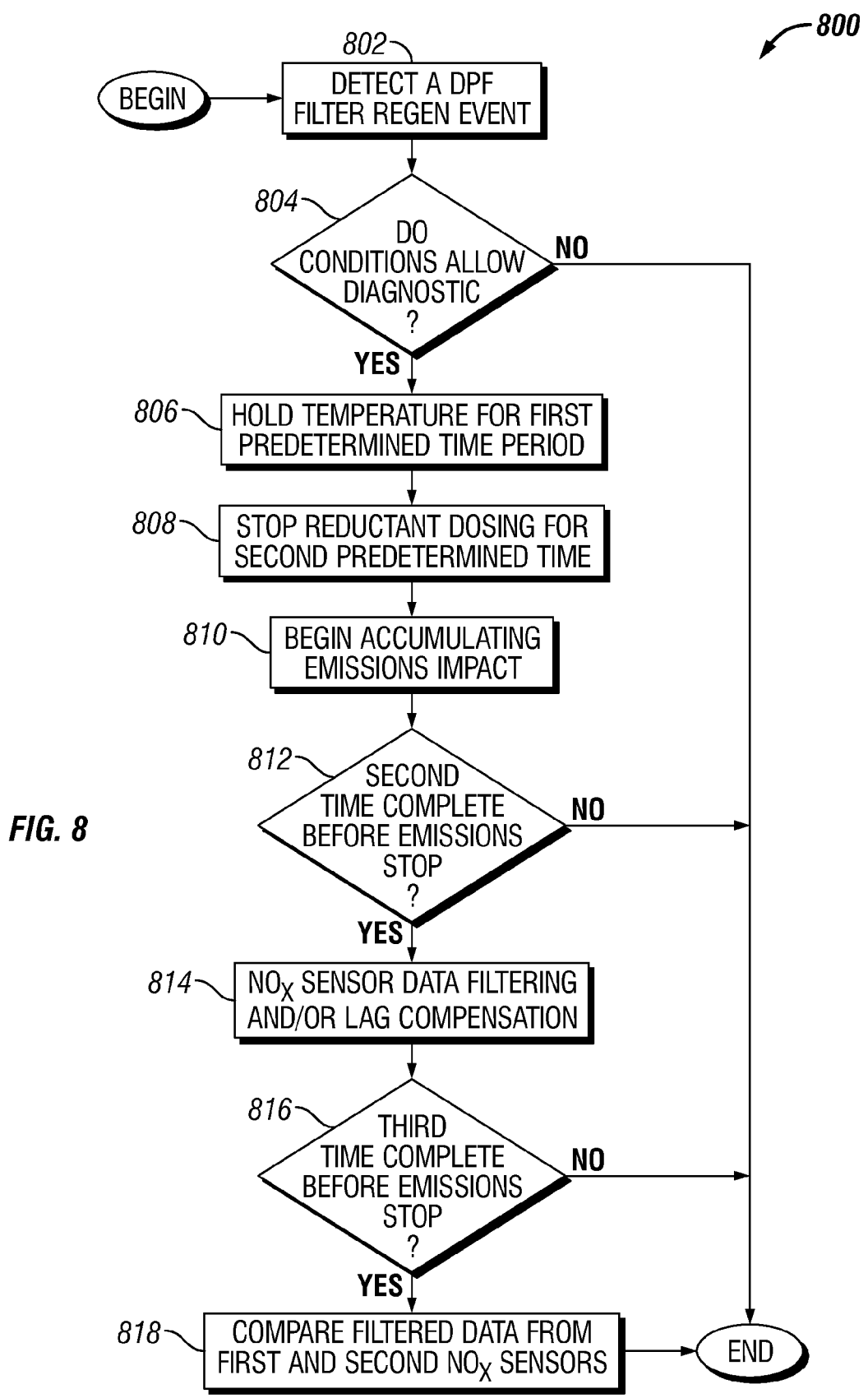
FIG. 8 is a schematic flow diagram of a diagnosis procedure.

FIG. 8 is a schematic flow diagram 800 of a diagnosis procedure for a $NO_x$ sensor. The procedure includes an operation 802 to detect a DPF filter regeneration event, and a determination 804 whether present engine operating conditions allow a $NO_x$ sensor diagnostic. Where the present engine operating conditions support a $NO_x$ sensor diagnostic, the procedure includes an operation 806 to hold a temperature of the SCR catalyst at an elevated value for a first predetermined time period, and an operation 808 to stop reductant dosing for a second predetermined time period. When the reductant dosing is stopped, the procedure includes an operation 810 to begin an ongoing accumulation of the emissions impact of the diagnostic procedure, and a determination 812 of whether the second predetermined time period is completed before the emissions impact is exceeded. Where the second predetermined time period is completed, the procedure includes an operation to continue holding the SCR catalyst temperature, to continue suppressing injection of reductant, and an operation 814 to filter the $NO_x$ sensor data for the first and second $NO_x$ sensors. The operation 814 to filter may further include an operation to compensate for time lag between the first $NO_x$ sensor and the second $NO_x$ sensor due to the finite time of the flow of exhaust gases from the first $NO_x$ sensor to the second $NO_x$ sensor. The procedure further includes a determination 816 whether a third predetermined time is complete before the emissions threshold is exceeded during the filtering of the $NO_x$ sensor outputs. The procedure further includes an operation 818 to compare the filtered data from the first and second $NO_x$ sensors.

Figure 9:
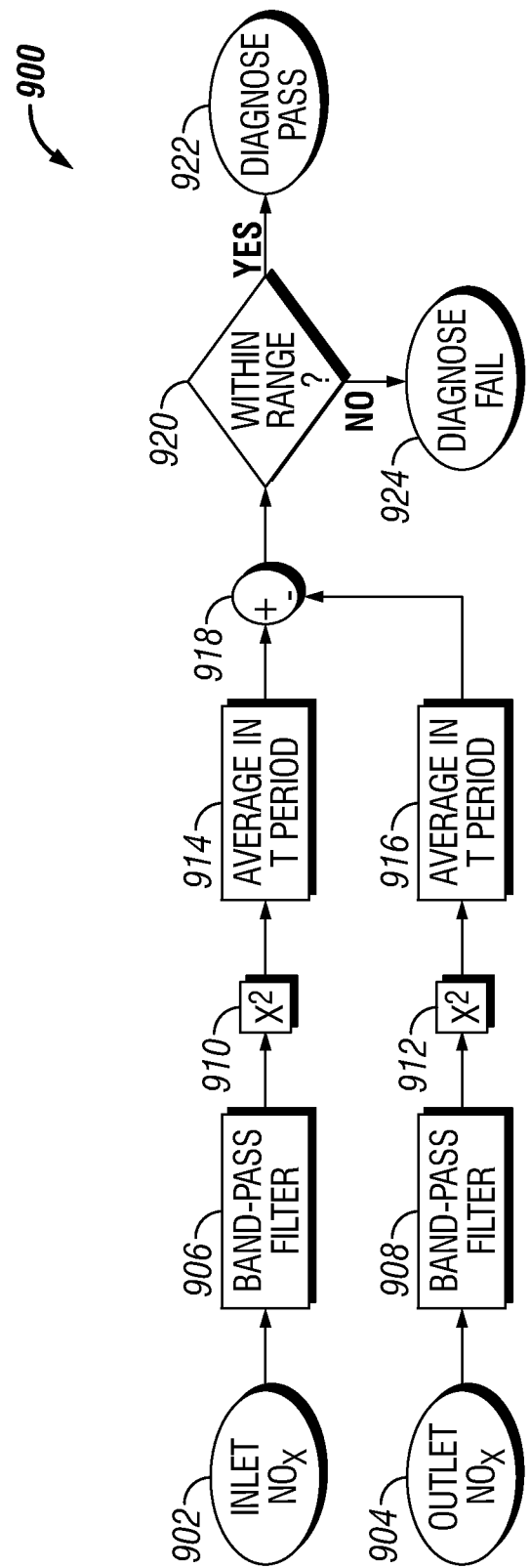
FIG. 9 is an illustration of a data processing operation for NO$_x$ sensor data.

FIG. 9 is an illustration of a data processing operation 900 for $NO_x$ sensor diagnostics. The data processing operation 900 includes passing an inlet $NO_x$ output 902 and an outlet $NO_x$ output 904 through band-pass filters 906, 908 and applying a function 910, 912 to each of the outputs. The functions 910, 912 are illustrated as squaring the outputs 902, 904. Alternative functions 910, 912 include applying a power function to the outputs, applying an absolute value to the outputs, applying a square root to the outputs, removing phase values from the outputs, transforming the outputs into frequency domain data, and/or performing a fast Fourier transform on the outputs. The products of the functions 910, 912 are averaged 914, 916 over the third predetermined time period, and a difference 918 is determined between the averages 914, 916. The difference 918 operation may alternatively include determining a ratio between the averages, applying a function to the averages, and/or providing the averages as inputs to a lookup table. The data processing operation 900 includes a determination 920 whether the difference 918 (or other function output) is within range. In an exemplary embodiment, the diagnostic has a PASS 922 output value in response to the difference being within range, and a FAIL 924 output value in response to the difference being out of range.

As is evident from the figures and text presented above, a variety of embodiments according to the present invention are contemplated.

An exemplary technique to diagnose a $NO_x$ sensor is described. The technique includes operations to diagnose the $NO_x$ sensor. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

The technique includes an operation to raise a temperature of an SCR catalyst for a predetermined time period while dosing urea (or other reductant). The selective catalytic reduction (SCR) catalyst has at least some ammonia storage capacity. The operation to raise the temperature of the SCR catalyst for a predetermined time reduces stored ammonia on the SCR catalyst to a very low level, or to a negligible ammonia level. The temperature may be raised to a level sufficient to drive ammonia stored to an acceptably low level (determinable by the ammonia storage versus temperature function of the SCR catalyst and by the level of ammonia storage that supports an accurate diagnostic operation of the $NO_x$ sensor), to a temperature of at least about 500° C., and/or to a regeneration temperature for an aftertreatment component (e.g. a diesel particulate filter (DPF)). Certain systems perform periodic high temperature regeneration events on the aftertreatment component—for example to oxidize soot from a DPF—and the technique described herein may, in certain embodiments, be performed immediately following such a regeneration to minimize the impact of the diagnostic to the fuel economy and performance of the system. The predetermined time period may also be calculated in real time during the operation of the technique.

The technique further includes an operation to maintain the temperature of the SCR catalyst without dosing urea for a second predetermined time period. The operation to maintain the temperature of the SCR catalyst further drives off remaining ammonia from the SCR catalyst, as even at high temperature the SCR catalyst stores some ammonia on the surface in dynamic equilibrium when ammonia is still supplied to the SCR catalyst. The maintained temperature may be the same temperature as the first operation where the urea (or other reductant) dosing was still occurring. However, the maintained temperature may be a different temperature as well—for example the temperature during the first operation may be higher (e.g. where a regeneration temperature is higher than an ammonia removal temperature) or lower (e.g. where a regeneration temperature is lower than the ammonia removal temperature, and/or to save energy during the first operation and to enhance ammonia removal during the second operation).

The operation to maintain the temperature of the SCR catalyst occurs for a pre-scheduled open loop amount of time (the second predetermined time period) which may be about 1 minute, anywhere from 30 seconds to 2 minutes, or any other time determined empirically from testing the SCR catalyst. In certain embodiments, the operation to maintain the temperature occurs in a closed loop fashion, with the operation being completed when a reading from a first $NO_x$ sensor matches a reading from a second $NO_x$ sensor, when the readings from the first and second $NO_x$ sensor reach a steady state value, and/or when a difference between the first and second $NO_x$ sensor reaches a steady state value. The second predetermined time period may also be calculated in real time during the operation of the technique.

The technique further includes an operation to filter out at least low frequency data from the first $NO_x$ sensor upstream of the SCR catalyst and from the second $NO_x$ sensor downstream of the SCR catalyst. The operation to filter out low frequency data includes an executing a high pass filter on the first and second $NO_x$ sensor data. The high pass filter is structured to remove low frequency data, and in certain embodiments is structured to significantly attenuate frequency data lower than 0.15 Hz on the first and second $NO_x$ sensor data. In alternate or additional embodiments, the technique further includes an operation to filter out high frequency data from the first $NO_x$ sensor upstream of the SCR catalyst and from the second $NO_x$ sensor downstream of the SCR catalyst. The operation to filter out high frequency data includes executing a band pass filter on the first and second $NO_x$ sensor data. The band pass filter is structured to significantly attenuate frequency data outside the range 0.2 Hz to 0.5 Hz on the first and second $NO_x$ sensor data, or alternatively to significantly attenuate frequency data outside the range 0.3 Hz to 0.5 Hz on the first and second $NO_x$ sensor data.

The operations to filter out low frequency data, and potentially to filter out high frequency data, may be performed with a band pass filter, or with sequential filtering with a high pass filter and a low pass filter. In alternate embodiments, for example where high accuracy is desirable and available computing power is readily available, the frequency data may be determined by a frequency-based transformation such as a Fourier or Fast-Fourier transform. The data peaks generated thereby, within the frequency bands of interest, may be utilized in the operation to compare the filtered data described following.

The technique further includes an operation to compare the filtered data from the first $NO_x$ sensor and the second $NO_x$ sensor over a third predetermined time period. The filtered data (either by direct filtering or by transforming and data selection, as described preceding) is determined over the third predetermined time period and a comparison is made. The comparison may be an average magnitude of the first $NO_x$ sensor reading relative to an average magnitude of the second $NO_x$ sensor reading over the testing period. Other magnitude comparison techniques understood in the art may be utilized, including at least comparing a filtered magnitude of the first $NO_x$ sensor reading (e.g. a low-pass filter of the previously filtered values) to a filtered magnitude of the second $NO_x$ sensor reading or comparing a moving average of the first $NO_x$ sensor reading to a moving average of the second $NO_x$ sensor reading. During the third predetermined time period, the operations to maintain the temperature of the SCR catalyst without dosing urea continue.

The third predetermined time period may be an open loop time period such as 30 seconds. In certain embodiments, the third predetermined time period may be a statistical confidence period, or a period over which the data from the first $NO_x$ sensor reading overlaps the data from the second $NO_x$ sensor reading in the time domain to an extent where the data can be considered to cover the same $NO_x$ readings over the same time period. The statistical confidence period can be determined empirically, for example by testing sensors that are known to match at conditions simulating the largest operational time lag that will be experienced by the installed sensors in the system (e.g. lowest operational fluid flow rate) until a time period is determined to be long enough that the flow time lag from the first $NO_x$ sensor to the second $NO_x$ sensor introduces negligible error to compared filtered sensor data. The statistical confidence period may also be determined by modeling the system to determine the amount of time that data should be taken according to the desired confidence level and the estimated time lag of the system.

In certain embodiments, the technique includes an operation to determine a flow time lag between the first and second $NO_x$ sensors, and to compensate the first and second $NO_x$ sensor data in response to the flow time lag. Where the first and second $NO_x$ sensor data can be reliably compensated to match in the time domain, the third predetermined time period can be reduced to a time period of anything greater than about 4 seconds. The determination of the flow time lag depends upon the accuracy and response time of available data such as the fluid volumetric flow, the system volume between the first and second $NO_x$ sensors, and/or other information that can be utilized to determine those parameters. The availability, accuracy, and response time of time lag information will be understood to those of skill in the art contemplating a specific system and having the benefit of the disclosures herein. In certain embodiments, the time lag between the first and second $NO_x$ sensors can be only partially compensated, and an intermediate third time period between 4 seconds and 30 seconds is utilized. The third predetermined time period may also be calculated in real time during the operation of the technique.

In certain embodiments, the technique includes an operation to provide a $NO_x$ sensor condition index for the first $NO_x$ sensor and/or for the second $NO_x$ sensor in response to the comparing. For example, when the values of the $NO_x$ sensors do not match, the first or the second $NO_x$ sensor may be determined to be failed, a fault may be set, and/or a malfunction indicator lamp or other notification may be activated. The $NO_x$ sensor condition index may be qualitative (e.g. GOOD, SUSPECT, FAILED) or quantitative (e.g. based on a function of a magnitude ratio between the sensors). The operations to set a fault or notification may include processing such as incrementing a fault value before setting a fault, requiring multiple failure indications before setting the fault, or any other fault handling procedures known in the art.

In certain embodiments, the first $NO_x$ sensor is diagnosed in response to an engine-out $NO_x$ model, and the $NO_x$ sensor condition index is determined for the second $NO_x$ sensor. For example, if the first $NO_x$ sensor is determined to be GOOD in response to the first $NO_x$ sensor matching an engine-out $NO_x$ model, any difference between the first and second $NO_x$ sensor may be attributable to the second $NO_x$ sensor.

In certain embodiments, the technique includes determining whether an internal combustion engine is producing greater than a threshold amount of $NO_x$, and the operation to maintain the temperature of the aftertreatment component without dosing urea (or other reductant) for a second predetermined time period is delayed and/or aborted in response to determining the engine is producing greater than the threshold amount of $NO_x$. The operation to delay or abort the operation to stop dosing urea provides control of the overall impact of the technique on the emissions of the engine. In many circumstances, the emissions during the technique need to be included in the emissions certification for the engine. Certain embodiments include the operation to perform the diagnostic technique only at lower engine emissions levels. In certain embodiments, the technique includes an operation to commence the operation to maintain the temperature of the aftertreatment component without dosing urea for the second predetermined time period in response to an engine motoring event.

The technique further includes an operation to perform a data processing operation on the filtered data from the first and second $NO_x$ sensor. The data processing operation includes squaring the data, applying a power function to the data, applying an absolute value to the data, applying a square root to the data, and/or removing phase values from the data.

An exemplary set of embodiments is an apparatus including a controller and a plurality of modules structured to functionally execute operations for diagnosing a $NO_x$ sensor. The apparatus includes a diagnostic staging module that maintains a diagnostic temperature target in an SCR catalyst for a predetermined time period. The apparatus further includes a reductant dosing module that provides a reductant dosing command. The apparatus further includes a reductant doser responsive to the reductant dosing command. The diagnostic staging module further commands, at the end of the predetermined time period, a reductant dosing module to stop dosing reductant for a second predetermined time period and continues to maintain the diagnostic temperature target. At the end of the second predetermined time period, the diagnostic staging module further continues to command the reductant dosing module to stop dosing reductant and to maintain the diagnostic temperature target for a third predetermined time period. The apparatus includes an SCR diagnostic module that, during the third predetermined time period, provides a sensor condition index in response to a comparison of data from a first $NO_x$ sensor upstream of the SCR catalyst and a second $NO_x$ sensor downstream of the SCR catalyst.

Certain exemplary and non-limiting embodiments of the apparatus are further described following. An exemplary apparatus includes a sensor filtering module that, during the third predetermined period of time, filters sensor data from each of the first $NO_x$ sensor and the second $NO_x$ sensor. The filtering includes filtering out at least low frequency response data from the sensors. Exemplary, non-limiting filters include a high pass filter, a band-pass filter, and/or a low-pass filter and a high-pass filter sequentially. The sequential low-pass filter and high-pass filter may be performed in any order. An exemplary sensor filtering module further applies a filter that substantially attenuates sensor frequency data from each sensor lower than at least 0.15 Hz. Another exemplary sensor filtering module further applies a filter that substantially attenuates sensor frequency data from each sensor outside the range 0.2 Hz to 0.5 Hz. In certain embodiments, the diagnostic temperature target includes a negligible ammonia storage temperature and at least 500° C.

An exemplary apparatus includes a sensor phasing module that corrects for a flow time lag between the first $NO_x$ sensor and the second $NO_x$ sensor before the sensor filtering module filters the sensor data from each sensor. An exemplary SCR diagnostic module further provides the sensor condition index to a diagnostic output device. Exemplary diagnostic devices include a malfunction indicator lamp, an engine controller, a transmission controller, an aftertreatment controller, and/or a datalink.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   raising a temperature of an SCR catalyst for a first predetermined time period while dosing urea, wherein at least a portion of the first predetermined time period occurs during an aftertreatment component regeneration event;
   maintaining the temperature of the SCR catalyst without dosing urea for a second predetermined time period;
   filtering out at least low frequency data from a first $NO_x$ sensor upstream of the SCR catalyst and from a second $NO_x$ sensor downstream of the SCR catalyst;
   comparing the filtered data from the first $NO_x$ sensor and the second $NO_x$ sensor without dosing urea over a third predetermined time period;
   providing a $NO_x$ sensor condition index for at least one of the first $NO_x$ sensor and the second NOx sensor in response to the comparing;
   determining whether the engine is producing greater than a threshold amount of $NO_x$; and
   in response to the engine producing greater than the threshold amount of $NO_x$, performing one of:
      delaying the maintaining the temperature of the SCR catalyst without dosing urea for the second predetermined time period; and
      aborting the method.

2. The method of claim 1, further comprising diagnosing the first $NO_x$ sensor in response to an engine-out $NO_x$ model, and wherein the providing the $NO_x$ sensor condition index is for the second $NO_x$ sensor.

3. The method of claim 1, wherein the maintaining the temperature comprises maintaining the temperature to one of a negligible ammonia storage temperature and at least 500° C.

4. The method of claim 1:
   wherein the first predetermined time period comprises one of about 10 minutes and an ammonia storage reduction time;
   wherein the second predetermined time period comprises one of: at least one minute and a period between 30 seconds and two minutes; and
   wherein the third predetermined time period comprises one of: 30 seconds and a statistical confidence period.

5. The method of claim 1, wherein the filtering comprises a filtering operation selected from the filtering operations consisting of:
   executing a high pass filter on the first and second $NO_x$ sensor data;
   significantly attenuating frequency data lower than at least 0.15 Hz on the first and second $NO_x$ sensor data;
   executing a band pass filter on the first and second $NO_x$ sensor data; and
   significantly attenuating frequency data outside the range 0.2 Hz to 0.5 Hz on the first and second $NO_x$ sensor data.

6. The method of claim 1, further comprising determining a flow time lag between the first and second $NO_x$ sensors, compensating the first and second $NO_x$ sensor data in response to the flow time lag, and wherein the third predetermined time period comprises a time greater than 4 seconds.

7. The method of claim 1, further comprising beginning the maintaining the temperature of the aftertreatment component without dosing urea for the second predetermined time period in response to an engine motoring event or low engine out NOx condition.

8. The method of claim 1, further comprising performing a data processing operation on the filtered data of the first and second $NO_x$ sensors, the data processing operation comprising an operation selected from the operations consisting of:
   squaring the data;
   applying a power function to the data;
   applying an absolute value to the data;
   applying a square root to the data;
   removing phase values from the data;
   transforming the data into a frequency domain; and
   performing a fast Fourier transform on the data.

9. The method of claim 1, wherein the comparing comprises determining one of a difference and a ratio between a first average data from the first $NO_x$ sensor and a second average data from the second $NO_x$ sensor.

10. A method, comprising:
    raising a temperature of an SCR catalyst for a first predetermined time period while dosing urea, wherein at least a portion of the first predetermined time period occurs during an aftertreatment component regeneration event;
    maintaining the temperature of the SCR catalyst without dosing urea for a second predetermined time period;
    comparing data from a first $NO_x$ sensor and a second $NO_x$ sensor without dosing urea over a third predetermined time period;
    providing a $NO_x$ sensor condition index for at least one of the first $NO_x$ sensor and the second $NO_x$ sensor in response to the comparing;
    determining whether the engine is producing greater than a threshold amount of $NO_x$; and
    in response to the engine producing greater than the threshold amount of $NO_x$, performing one of:
       delaying the maintaining the temperature of the SCR catalyst without dosing urea for the second predetermined time period; and
       aborting the method.

11. The method of claim 10, further comprising diagnosing the first NOx sensor in response to an engine-out $NO_x$ model, and wherein the providing the $NO_x$ sensor condition index is for the second NOx sensor.

12. The method of claim 10, wherein the maintaining the temperature comprises maintaining the temperature to one of a negligible ammonia storage temperature and at least 500° C.

13. The method of claim 10:
    wherein the first predetermined time period comprises one of about 10 minutes and an ammonia storage reduction time;
    wherein the second predetermined time period comprises one of: at least one minute and a period between 30 seconds and two minutes; and
    wherein the third predetermined time period comprises one of: 30 seconds and a statistical confidence period.

14. The method of claim 10, further comprising determining a flow time lag between the first and second $NO_x$ sensors, compensating the first and second $NO_x$ sensor data in response to the flow time lag, and wherein the third predetermined time period comprises a time greater than 4 seconds.

15. The method of claim 10, further comprising beginning the maintaining the temperature of the aftertreatment component without dosing urea for the second predetermined time period in response to an engine motoring event or low engine out $NO_x$ condition.

16. An apparatus, comprising:
    a diagnostic staging module configured to maintain a diagnostic temperature target in an SCR catalyst for a first predetermined time period, wherein at least a portion of the first predetermined time period occurs during an aftertreatment component regeneration event;
    a reductant dosing module configured to provide a reductant dosing command;
    a reductant doser responsive to the reductant dosing command;

the diagnostic staging module further configured to, at the end of the predetermined time period, command a reductant dosing module to stop dosing reductant for a second predetermined time period and to continue to maintain the diagnostic temperature target;

the diagnostic staging module further configured to, at the end of the second predetermined time period, continues to command the reductant dosing module to stop dosing reductant and to maintain the diagnostic temperature target for a third predetermined time period; and an SCR diagnostic module configured to, during the third predetermined period of time, provide a sensor condition index in response to a comparison of data from a first $NO_x$ sensor upstream of the SCR catalyst and a second $NO_x$ sensor downstream of the SCR catalyst;

wherein a diagnostic staging module is further configured to:
  determine an amount of $NO_x$ emission release based on the time to complete the diagnostic procedure, and
  determine at least one of whether to proceed with, wait to execute, and abort the diagnostic procedure in response to the determined amount of $NO_x$ emission release.

17. The apparatus of claim 16, further comprising a sensor filtering module configured to, during the third predetermined period of time, filter sensor data from each of the first $NO_x$ sensor and the second $NO_x$ sensor.

18. The apparatus of claim 17, wherein the sensor filtering module is further configured to filter the sensor data from each sensor by applying a filter selected from the filters consisting of: a high pass filter, a band-pass filter, a low-pass filter and a high-pass filter sequentially, and a high-pass filter and a low-pass filter sequentially.

19. The apparatus of claim 17, wherein the sensor filtering module is further configured to apply a filter that substantially attenuates sensor frequency data from each sensor lower than at least 0.15 Hz.

20. The apparatus of claim 17, The apparatus of claim 17, wherein the sensor filtering module is further configured to apply a filter that substantially attenuates sensor frequency data from each sensor outside the range 0.2 Hz to 0.5 Hz.

21. The apparatus of claim 16, wherein the diagnostic temperature target comprises one of a negligible ammonia storage temperature and at least 500° C.

22. The apparatus of claim 16, further comprising a sensor phasing module configured to correct for a flow time lag between the first $NO_x$ sensor and the second $NO_x$ sensor before the sensor filtering module filters the sensor data from each sensor.

23. The apparatus of claim 16, wherein the SCR diagnostic module is further configured to provide the sensor condition index to a diagnostic output device.

24. The apparatus of claim 23, wherein the diagnostic output device comprises a device selected from the devices consisting of a malfunction indicator lamp, an engine controller, a transmission controller, an aftertreatment controller, and a datalink.

* * * * *